(12) United States Patent
Laredo et al.

(10) Patent No.: US 9,292,363 B2
(45) Date of Patent: Mar. 22, 2016

(54) PREDICTING APPLICATION PROGRAMMING INTERFACE CONSUMPTION USING SOCIAL NETWORKS

(71) Applicant: International Business Machines Corporation, Armonk, NY (US)

(72) Inventors: Jim A. Laredo, Katonah, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/197,749

(22) Filed: Mar. 5, 2014

(65) Prior Publication Data

US 2015/0254560 A1 Sep. 10, 2015

(51) Int. Cl.
*G06F 13/00* (2006.01)
*G06F 9/54* (2006.01)
*H04L 29/06* (2006.01)

(52) U.S. Cl.
CPC .............. *G06F 9/542* (2013.01); *H04L 67/42* (2013.01)

(58) Field of Classification Search
CPC ...................................... G06F 9/541
See application file for complete search history.

(56) References Cited

U.S. PATENT DOCUMENTS

| | | | |
|---|---|---|---|
| 7,802,197 B2 | 9/2010 | Lew et al. | |
| 8,423,963 B2 | 4/2013 | Garbers et al. | |
| 9,135,591 B1 * | 9/2015 | Nicol | G06Q 10/06 |
| 2003/0036890 A1 | 2/2003 | Billet et al. | |
| 2008/0307387 A1 | 12/2008 | Yoon et al. | |
| 2010/0235823 A1 * | 9/2010 | Garbers | G06F 9/44536 717/170 |
| 2011/0307340 A1 | 12/2011 | Benmbarek et al. | |
| 2012/0143677 A1 | 6/2012 | Bruno et al. | |
| 2012/0284600 A1 | 11/2012 | Lin et al. | |
| 2013/0041860 A1 | 2/2013 | Lawrence et al. | |
| 2013/0132584 A1 * | 5/2013 | Palladino | H04L 65/40 709/226 |
| 2013/0179219 A1 | 7/2013 | Ross | |
| 2014/0173555 A1 * | 6/2014 | Ng | G06F 8/30 717/109 |
| 2015/0033330 A1 * | 1/2015 | Counterman | G06F 21/6245 726/20 |
| 2015/0128156 A1 * | 5/2015 | Zhu | G06F 8/74 719/328 |
| 2015/0222504 A1 * | 8/2015 | Srivastava | H04L 43/045 709/224 |
| 2015/0347201 A1 * | 12/2015 | Zhu | G06F 9/541 719/328 |

OTHER PUBLICATIONS

Dugundji et al.,"Modeling user behavior in adoption and diffusion of Twitter clients," 2011 IEEE International Conference on Privacy, Security, Risk, and Trust, and IEEE International Conference on Social Computing, Oct. 2011, pp. 1372-1379.

Tan et al., "Social Action Tracking via Noise Tolerant Time-varying Factor Graphs," Proceedings of the 16th ACM SIGKDD International Conference on Knowledge Discovery and Data Mining, Jul. 2010, pp. 1049-1058.

* cited by examiner

*Primary Examiner* — Philip Wang
(74) *Attorney, Agent, or Firm* — Yee & Associates, P.C.; Louis J. Percello (57) ABSTRACT

Predicting consumption of APIs is provided. A set of consumed APIs corresponding to a user and software service applications related to APIs associated with the user is determined based on an API consumption history. A set of users related to the set of consumed APIs corresponding to the user and the software service applications related to the APIs associated with the user is retrieved from an API analytics engine. A set of API consumption prediction models corresponding to the user is generated based on the APIs associated with the user, the software service applications related to the APIs associated with the user, the set of consumed APIs corresponding to the user and the software service applications related to the APIs associated with the user based on the API consumption history, the set of users related to the set of consumed APIs, and APIs associated with the set of users.

20 Claims, 5 Drawing Sheets

PREDICTING APPLICATION PROGRAMMING INTERFACE CONSUMPTION USING SOCIAL NETWORKS

BACKGROUND

1. Field

The disclosure relates generally to application programming interfaces and more specifically to predicting consumption of application programming interfaces using social networks of application programming interface providers and consumers.

2. Description of the Related Art

An application programming interface (API) is a set of routines, protocols, and tools for building software applications. An application programming interface makes it easier to develop a software application by providing all the basic building blocks. A developer then puts the building blocks together to create the software application. In essence, an application's application program interface defines the proper way for the developer to request services from that application. Although application program interfaces are designed for developers, application program interfaces are good for application program interface consumers because the application program interfaces guarantee that all applications using a common application program interface will have similar interfaces. For Simple Object Access Protocol (SOAP) and Representational State Transfer (REST) services, an application program interface comes as a specification of remote calls exposed to the application program interface consumers.

Application programming interfaces may be used for accessing a Web-based software service or a Web tool. Using application program interfaces, applications are able to talk to each other without any user knowledge or intervention. For example, when a user buys movie tickets online and enters credit card information, the movie ticket Web site uses an application program interface to send the credit card information to a remote application that verifies whether the credit card information is correct. Once payment is confirmed, the remote application sends a response back to the movie ticket Web site indicating that the move ticket Web site may issue the tickets to the user. The user only sees the movie ticket Web site interface, but behind the scenes many applications are working together using application program interfaces to provide the service.

In addition, a developer may publish an application program interface on a social network of application program interface developers so that other developers can design software products that are based on the published application program interface. Publishing application program interfaces online allows application program interface developer communities to create an open architecture for sharing content and data between communities and applications. As a result, software service applications may be based on application program interfaces from multiple developers at all levels, such as, for example, at the application level, the platform level, the infrastructure level, et cetera.

SUMMARY

According to one illustrative embodiment, a computer-implemented method for predicting consumption of application programming interfaces is provided. A computer determines a set of consumed application programming interfaces corresponding to a user and software service applications related to application programming interfaces associated with the user based on an application programming interface consumption history. The computer retrieves a set of users related to the set of consumed application programming interfaces corresponding to the user and the software service applications related to the application programming interfaces associated with the user from an application programming interface analytics engine based on an application programming interface social network of the user and an application programming interface user expertise registry. The computer generates a set of application programming interface consumption prediction models corresponding to the user based on the application programming interfaces associated with the user and their dependent application programming interfaces, the software service applications related to the application programming interfaces associated with the user and their dependent application programming interfaces, the set of consumed application programming interfaces corresponding to the user and the software service applications related to the application programming interfaces associated with the user based on the application programming interface consumption history, the set of users related to the set of consumed application programming interfaces, and application programming interfaces and their dependent application programming interfaces associated with the set of users. According to other illustrative embodiments, a computer system and a computer program product for predicting consumption of application programming interfaces are provided.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
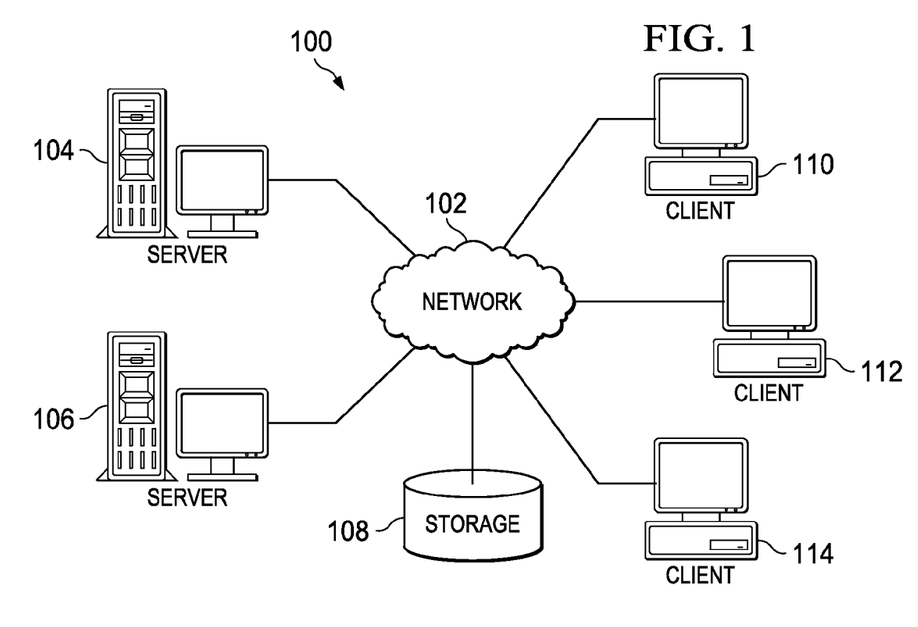
FIG. 1 is a pictorial representation of a network of data processing systems in which illustrative embodiments may be implemented.
Figure 2:
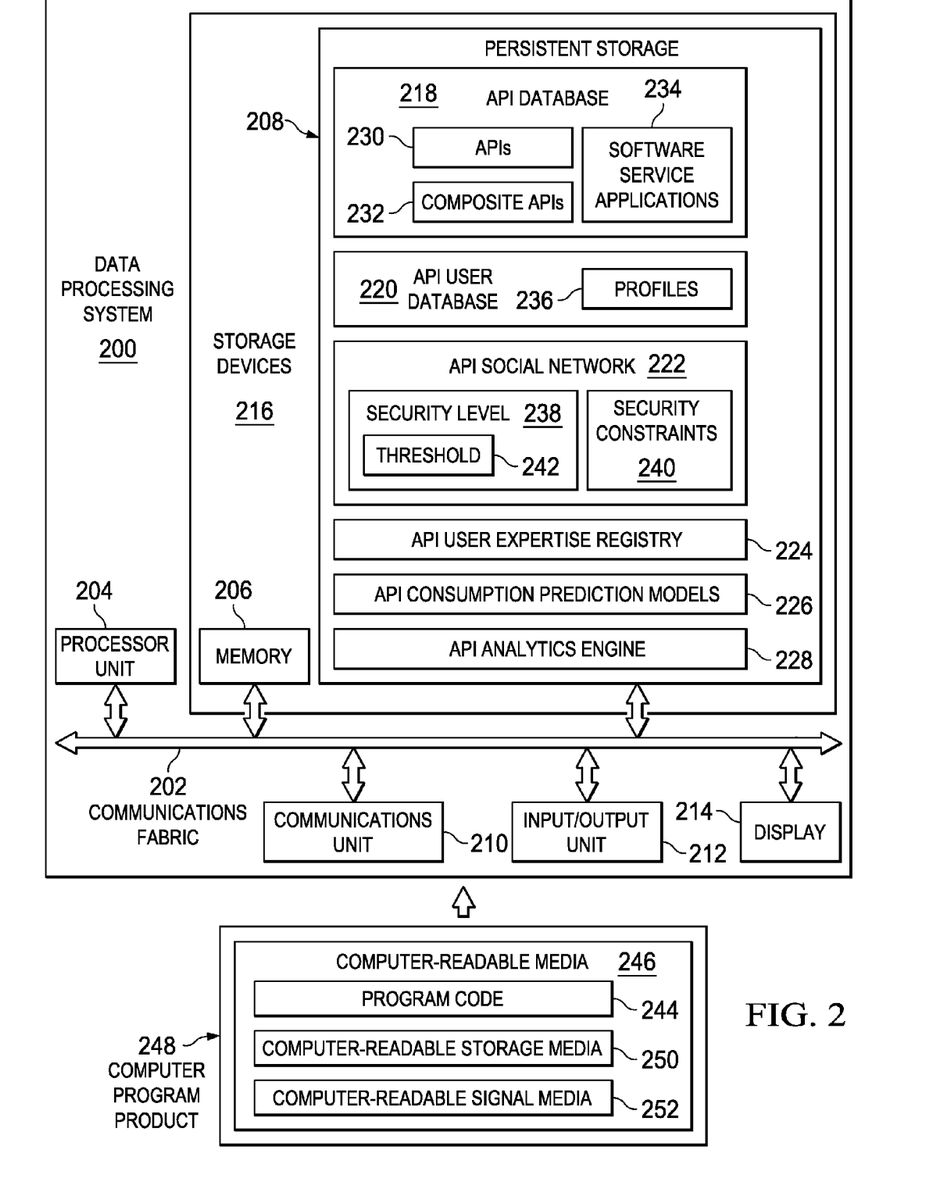
FIG. 2 is a diagram of a data processing system in which illustrative embodiments may be implemented.
Figure 3:
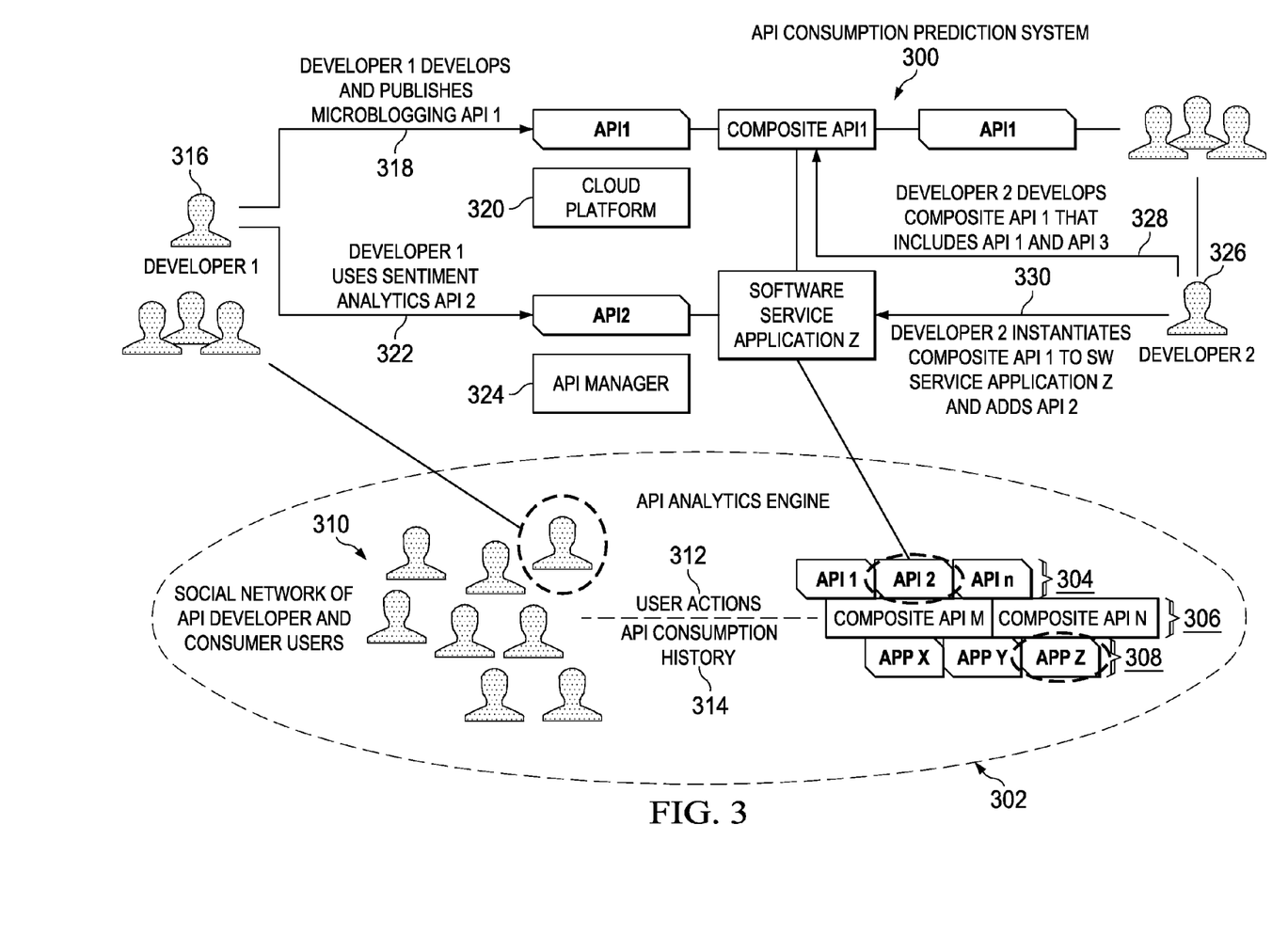
FIG. 3 is a diagram illustrating an application programming interface consumption prediction system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other data processing devices in which the illustrative embodiments may be implemented. Network data processing system 100 contains network 102, which is the medium used to provide communications links between the computers and the other data processing devices connected together within network data processing system 100. Network 102 may include connections, such as wire communication links, wireless communication links, or fiber optic cables.

In the depicted example, server 104 and server 106 connect to network 102, along with storage 108. Server 104 and server 106 may be, for example, server computers with high-speed connections to network 102. In addition, server 104 and/or server 106 may provide services to client devices connected to network 102. For example, server 104 and/or server 106 may provide a service that automatically selects a set of application programming interfaces for a particular user based on a history of application programming interface consumption by that user and other users associated with client devices connected to network 102.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114. Users of clients 110, 112, and 114 may utilize clients 110, 112, and 114 to access the application programming interface selection services provided by server 104 and/or server 106.

Clients 110, 112, and 114 may be, for example, personal computers, network computers, and/or portable computers, such as laptop computers, with wire and/or wireless communication links to network 102. In addition, clients 110, 112, and 114 also may represent mobile data processing systems, such as cellular telephones, smart phones, personal digital assistants, or handheld computers, with wireless communication links to network 102. It should be noted that clients 110, 112, and 114 may represent any combination of computers and mobile data processing systems connected to network 102.

Storage 108 is a network storage device capable of storing data in a structured or unstructured format. Storage 108 may provide storage for names of a plurality of different users and their associated identification numbers; user profiles and account information for each of the plurality of users; a plurality of different application programming interfaces associated with the plurality of users; and software service applications associated with the plurality of application programming interfaces. Further, storage unit 108 may store other data, such as authentication or credential data that may include user names, passwords, and biometric data associated with each of the plurality of users.

Also, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores application programming interface database 218, application programming interface user database 220, application programming interface social network 222, application programming interface user expertise registry 224, application programming interface consumption prediction models 226, and application programming interface analytics engine 228. However, it should be noted that persistent storage 208 may store any type of application, program, module, and/or data utilized by different illustrative embodiments.

Application programming interface database 218 stores application programming interfaces 230, composite application programming interfaces 232, and software service applications 234. Application programming interfaces 230 represent a plurality of different application programming interfaces developed by a plurality of different developers/providers of application programming interfaces. Composite application programming interfaces 232 represent a plurality of different composite application programming interfaces. A composite application programming interface is a set of two or more different application programming interfaces that are combined together to provide enhanced functionality. The different application programming interfaces included in a composite application programming interface may be developed by one developer or by different developers.

Software service applications 234 represent a plurality of different software service applications that provide a plurality of different online or Web services to users. Software service applications 234 are related to application programming interfaces 230 and/or composite application programming interfaces 232. In other words, software service applications 234 are based on application programming interfaces 230 and/or composite application programming interfaces 232 to provide the functionality of the different services and to provide communication capabilities with other applications.

Application programming interface user database 220 stores names and identification numbers associated with a plurality of different application programming interface users. An application programming interface user may be an application programming interface developer or may be an application programming interface consumer. An application programming interface developer creates and publishes application programming interfaces for use by application programming interface consumers. Application programming interface consumers use the published application programming interfaces to create new software service applications or modify existing software service applications.

Application programming interface user database 220 also stores profiles 236. Profiles 236 represent a plurality of different profiles for the plurality of different users. In other words, each user within application programming interface user database 220 is associated with a set of one or more profiles within profiles 236. Each profile may contain information, such as, for example, name and identifier of a particular user; account information associated with the particular user; a user name, password, and biometric data associated with the particular user; a role and/or position of the particular user within an enterprise; names and identifiers of all application programming interfaces and composite application programming interfaces the particular user has developed, collaborated on, worked on, used, and owns; names and identifiers of all dependent application programming interfaces corresponding to the application programming interfaces associated with the particular user; and names and identifiers of all software service applications related to the application programming interfaces and composite application programming interfaces associated with the user and their dependent application programming interfaces.

Application programming interface social network 222 stores information regarding social networks of application programming interface developers and consumers associated with each of the users listed within application programming interface user database 220. Data processing system 200 utilizes the information within application programming interface social network 222 to monitor the social networks of the developers and consumers for network integrity and security purposes. Application programming interface social network 222 also stores security level 238 and security constraints 240.

Security level 238 represents a set of one or more security levels corresponding to application programming interface social network 222. A security level may be, for example, a high security level, a medium security level, or a low security level indicating a degree of security or integrity associated with a particular social network of developers and consumers. Security level 238 includes threshold 242. Threshold 242 represents a set of one or more threshold values that define the set of security levels. In other words, each security level may have a corresponding threshold value.

Security constraints 240 define limitations on application programming interface social network 222. For example, a constraint on application programming interface social network 222 may be that no more than a predetermined number of developer or consumer users may be added to application programming interface social network 222 within a predetermined period of time. If more than the predetermined number of users is added to application programming interface social network 222 within the predetermined period of time, then data processing system 200 may consider application programming interface social network 222 as being compromised or unsecure. As a result, data processing system 200 may send a security alert message to a system administrator regarding the integrity of application programming interface social network 222.

Application programming interface user expertise registry 224 stores information regarding the skill level, knowledge level, and/or area of interest or expertise of different application programming interface users. Application programming interface user expertise registry 224 may store information, such as, for example, a background of a user, what types of application programming interfaces the user has previously developed, potential capabilities of an application programming interface that may be developed by the user based on the expertise of the user, and the like. Data processing system 200 may utilize application programming interface user expertise registry 224 to select a set of one or more application programming interface users that may have expertise regarding development and/or consumption of a particular set of one or more application programming interfaces.

Application programming interface consumption prediction models 226 represents a plurality of different application programming interface consumption prediction models that correspond to the plurality of different users. Data processing system 200 may generate a set of one or more application programming interface consumption prediction models for each user. Data processing system 200 may utilize a set of application programming interface consumption prediction models corresponding to a particular user to automatically select a set of one or more application programming interfaces for that particular user during development of a software service application, for example. Data processing system 200 may generate the set of application programming interface consumption prediction models corresponding to the particular user based on application programming interfaces associated with the user and their dependent application programming interfaces, software service applications related to the application programming interfaces associated with the user and their dependent application programming interfaces, a set of most consumed application programming interfaces corresponding to the user and the software service applications related to the application programming interfaces associated with the user based on an application programming interface consumption history, a set of users related to the set of most consumed application programming interfaces, and application programming interfaces and their dependent application programming interfaces associated with the set of related users.

Application programming interface analytics engine 228 is a diagram that shows relationships between the information within application programming interface database 218, application programming interface user database 220, application programming interface social network 222, application programming interface user expertise registry 224, and application programming interface consumption prediction models 226. Data processing system 200 may utilize application programming interface analytics engine 228 to determine relationships between a particular user, application programming interfaces associated with the user, software service applications related to the application programming interfaces associated with the user, other users associated with the user via application programming interface social network 222, application programming interfaces associated with the other users, expert users related to the application programming interfaces associated with the user in application programming interface user expertise registry 224, and application programming interface consumption prediction models associated with the user. Data processing system 200 utilizes this relationship information located within application programming interface analytics engine 228 to predict which application programming interfaces the particular user may need for a software service application development project, for example, and then automatically send those application programming interfaces to the user.

Application programming interface analytics engine 228 may be, for example, a noise-tolerant time-varying factor graph that models and predicts application programming interface consumption by each of the plurality of users. Noise-tolerant means that data processing system 200 eliminates or removes non-relevant or low quality application programming interface information from application programming interface analytics engine 228. Time-varying means that data processing system 200 continuously or on a predetermined time interval basis updates application programming interface analytics engine 228 as data processing system 200 obtains or generates new or updated information. Application programming interface analytics engine 228 may simultaneously model the users' application programming interface social network structure, attributes of the users listed within profiles of the users, and an application programming interface consumption history of the users to predict future application programming interface needs of each of the plurality of users.

Communications unit 210, in this example, provides for communication with other data processing systems and computing devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user, such as system administrator. In addition, display 214 may include touch screen capabilities to receive user input.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 2442.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments it was discovered that social network influenced, time-dependent user actions and application programming interface consumption relationships between users are indicators of application programming interface consumption patterns. In addition, application programming interface consumption and development of new application programming interface capabilities may be enhanced by augmenting knowledge derived from application programming interface consumption models and by mining the relationships between users who share common application programming interface consumption patterns. Illustrative embodiments utilize an application programming interface analytics engine to predict application programming interface consumption trends of application programming interface users based on social network activity of the users.

The application programming interface analytics engine may be, for example, an enhanced noise-tolerant time-varying factor graph with application to application programming interface consumption trends based on information regarding application programming interface networks, user social networks, user expertise, and application programming interface consumption history associated with the users. As a result, illustrative embodiments may guide design of Terms of Service (ToS) for application programming interfaces, composite application programming interfaces, and related software service applications. Further, illustrative embodiments may predict the use and allocation of system resources for hosting the application programming interfaces, composite application programming interfaces, and related software service applications.

Thus, illustrative embodiments of the present invention provide a computer-implemented method, computer system, and computer program product for predicting consumption of application programming interfaces. A computer determines a set of consumed application programming interfaces corresponding to a user and software service applications related to application programming interfaces associated with the user based on an application programming interface consumption history. The computer retrieves a set of users related to the set of consumed application programming interfaces corresponding to the user and the software service applications related to the application programming interfaces associated with the user from an application programming interface analytics engine based on an application programming interface social network of the user and an application programming interface user expertise registry. The computer generates a set of application programming interface consumption prediction models corresponding to the user based on the application programming interfaces associated with the user and their dependent application programming interfaces, the software service applications related to the application programming interfaces associated with the user and their dependent application programming interfaces, the set of consumed application programming interfaces corresponding to the user and the software service applications related to the application programming interfaces associated with the user based on the application programming interface consumption history, the set of users related to the set of consumed application programming interfaces, and application programming interfaces and their dependent application programming interfaces associated with the set of users.

With reference now to FIG. 3, a diagram illustrating an application programming interface consumption prediction system is depicted in accordance with an illustrative embodiment. Application programming interface consumption prediction system 300 is a system for predicting consumption of application programming interfaces by users. Application programming interface consumption prediction system 300 may be implemented in a network of data processing systems, such as, for example, network data processing system 100 in FIG. 1.

Application programming interface consumption prediction system 300 may include, for example: a set of one or more computers; a set of one or more social networks of application programming interface developer/providers and consumers; a set of social media activities of users associated with application programming interfaces and composite application programming interfaces; a user expertise registry; user profiles; a database of application programming interfaces, composite application programming interfaces, and their dependent application programming interfaces.

Application programming interface consumption prediction system 300 utilizes application programming interface analytics engine 302 to predict user consumption of application programming interfaces. Application programming interface analytics engine 302 may be, for example, application programming interface analytics engine 228 in FIG. 2. Application programming interface analytics engine 302 defines and maps the relationships between application programming interfaces 304, composite application programming interfaces 306, software service applications 308, social network of application programming interface developer and consumer users 310, user actions 312, and application consumption history 314.

Application programming interfaces 304, composite application programming interfaces 306, and software service applications 308 may be, for example, application programming interfaces 230, composite application programming interfaces 232, and software service applications 234 in FIG. 2. Social network of application programming interface developer and consumer users 310 may be, for example, application programming interface social network 222 in FIG. 2. User actions 312 are a record of actions taken by users on application programming interfaces 304, composite application programming interfaces 306, and software service applications 308. Actions may be, for example, development of particular application programming interfaces, composite application programming interfaces, and software service applications by users or use of particular application programming interfaces, composite application programming interfaces, and software service applications by the users. Application programming interface consumption history 314 is a record of consumption of particular application programming interfaces and composite application programming interfaces in the development of particular software service applications by users.

Application programming interface consumption prediction system 300 utilizes application programming interface consumption tacking to learn how to predict activities of users at a particular point in time (t). Application programming interface consumption prediction system 300 also may utilize a user action bias factor to increase a confidence level into predictions of application programming interface consumption by users. The user action bias factor defines an actual intention degree of a particular user to perform a particular application programming interface action. In addition, application programming interface consumption prediction system 300 may assume: 1) that a user's actions at time t are influenced by other users' historic actions within the same social network regarding related software service applications and application programming interfaces; 2) that a user's actions may be dependent on the user's previous actions on a given software service application or application programming interface; and 3) that users' actions occurring at a same time t have a strong correlation. As a result, application programming interface consumption prediction system 300 may provide an output of a set of predicted application programming interface user actions with a percentage probability.

FIG. 3 illustrates some of the different types of information that application programming interface consumption prediction system 300 may include within application programming interface analytics engine 302. For example, developer 1 316 of one application programming interface social network develops and publishes microblogging application programming interface 1 at 318. Cloud platform 320 utilizes microblogging application programming interface 1. In addition, developer 1 316 uses sentiment analytics application programming interface 2 at 322. Application programming interface manager 324 manages sentiment analytics application programming interface 2. Further, developer 2 326 of another application programming interface social network develops composite application programming interface 1 that includes application programming interface 1 and application programming interface 3 at 328. Developer 2 326 also instantiates composite application programming interface 1 to software service application Z and adds application programming interface 2 at 330. However, it should be noted that FIG. 3 is only intended as an example and not as a limitation on different illustrative embodiments. In other words, application programming interface analytics engine 302 may include other types of information not shown in this example.

A data model of application programming interface analytics engine 302 may be formally expressed as $G=(V^t, E^t, X^t, S^t, R^t, Y^t)$. $V^t$ equals a set of application programming interface users at time t. $E^t$ equals a set of links between the set of users at time t. $X^t$ equals a user attribute matrix of all users within a social network of application programming interface users at time t. Within the user attribute matrix, each row corresponds to a particular user and each column corresponds to a user attribute that describes a specific user characteristic. An example of an attribute may be that a particular user worked on a particular application programming interface for the past five months, the particular user is in a same organizational chain as other users, the particular user is a retail expert, the particular user accessed a particular software service application, the particular user accessed a composite application programming interface that utilizes the particular software service application, the particular user developed the particular software service application, et cetera. $S^t$ equals a set of software services at time t. $R^t$ equals a set of roles associated with the set of users at time t. $Y^t$ equals a user action history of all users at time t.

Application programming interface consumption prediction system 300 may generate the data model of application programming interface analytics engine 302 by utilizing a plurality of different equations, such as, for example, a user action bias equation, an influence factor equation, a correlation factor equation, and a joint probability equation. The user action bias equation may be, for example, a Gaussian function, such as:

$$f(y_i^t \mid z_i^t) = \frac{1}{\sqrt{2\pi\sigma^2}} \exp\left\{-\frac{(y_i^t - z_i^t)^2}{2\sigma^2}\right\}.$$

The user action bias equation generates a percentage probability of a user's application programming interface action at time t given a continuous latent state.

The influence factor equation may be based on the user attribute matrix that describes an application programming interface social network at time t−1. The influence factor equation may be, for example:

$$f(z_i^t \mid z_{\sim v_i}^{t-1}) = \frac{1}{Z_1} \exp\left\{\sum_{j=1}^{N} \lambda_{ji} m_{ji}^{t-1} g_{ji}(z_i^t, z_j^{t-1})\right\}.$$

The influence factor equation reflects other users' influence on a particular user's application programming interface actions at time t.

The correlation factor equation may be modeled in, for example, a Markov random field. The correlation factor equation may be, for example:

$$f(z_i^t \mid z_{\sim v_i}^t, x_i) = \frac{1}{Z_2} \exp\left\{\left(\sum_{j=1}^{N} \beta_{ij} m_{ij}^t h_{ij}(z_i^t, z_j^t)\right) + \sum_{k=1}^{d} \alpha_k h_k(z_i^t, x_{ik}^t)\right\}.$$

The correlation factor equation denotes correlation between application programming interface users' actions at time t.

The joint probability equation integrates the user action bias, influence factor, and correlation factor equations to generate a joint probability of a user's application programming interface action at time t. The joint probability equation may be, for example:

$$p(Y \mid G) = \frac{1}{Z} \exp\left\{\sum_{t=1}^{T} \sum_{i=1}^{N} \frac{(y_i^t - z_i^t)^2}{2\sigma^2} + \sum_{t=1}^{T} \sum_{i=1}^{N} \sum_{j=1}^{N} \lambda_{ij} m_{ji}^{t-1} g(z_i^t, z_j^{t-1}) + \sum_{t=1}^{T} \sum_{i=1}^{N} \sum_{j=1}^{N} \beta_{ij} m_{ij}^t h_{ij}(z_i^t, z_j^t) + \sum_{t=1}^{T} \sum_{i=1}^{N} \sum_{k=1}^{d} \alpha_k h_k(z_i^t, x_{ik}^t)\right\}.$$

Using application programming interface analytics engine 302, application programming interface consumption prediction system 300 may identify one or more consumption patterns for a given application programming interface, composite application programming interface, software service application, or a combination thereof. In addition, application programming interface consumption prediction system 300 may identify different application programming interface consumer groups based on a group's user profiles/domains and current or historic application programming interface and composite application programming interface consumption levels. Further, application programming interface consumption prediction system 300 may identify application programming interface development influencers within a particular social network of application programming interface developers/providers.

Developer/providers may utilize application programming interface consumption prediction system 300 to define/segment target consumer groups. Developer/providers also may utilize application programming interface consumption prediction system 300 to define corresponding application programming interface terms of service and conditions, which may include pricing policies that may be dynamically updated on a continuous basis or on a predetermined time interval basis. Furthermore, developer/providers may utilize application programming interface consumption prediction system 300 to determine, allocate, and plan for system resources required to host application programming interfaces, composite application programming interfaces, and their related software service applications built on top of them to scale up or down with consumer demand.

Figure 4A:
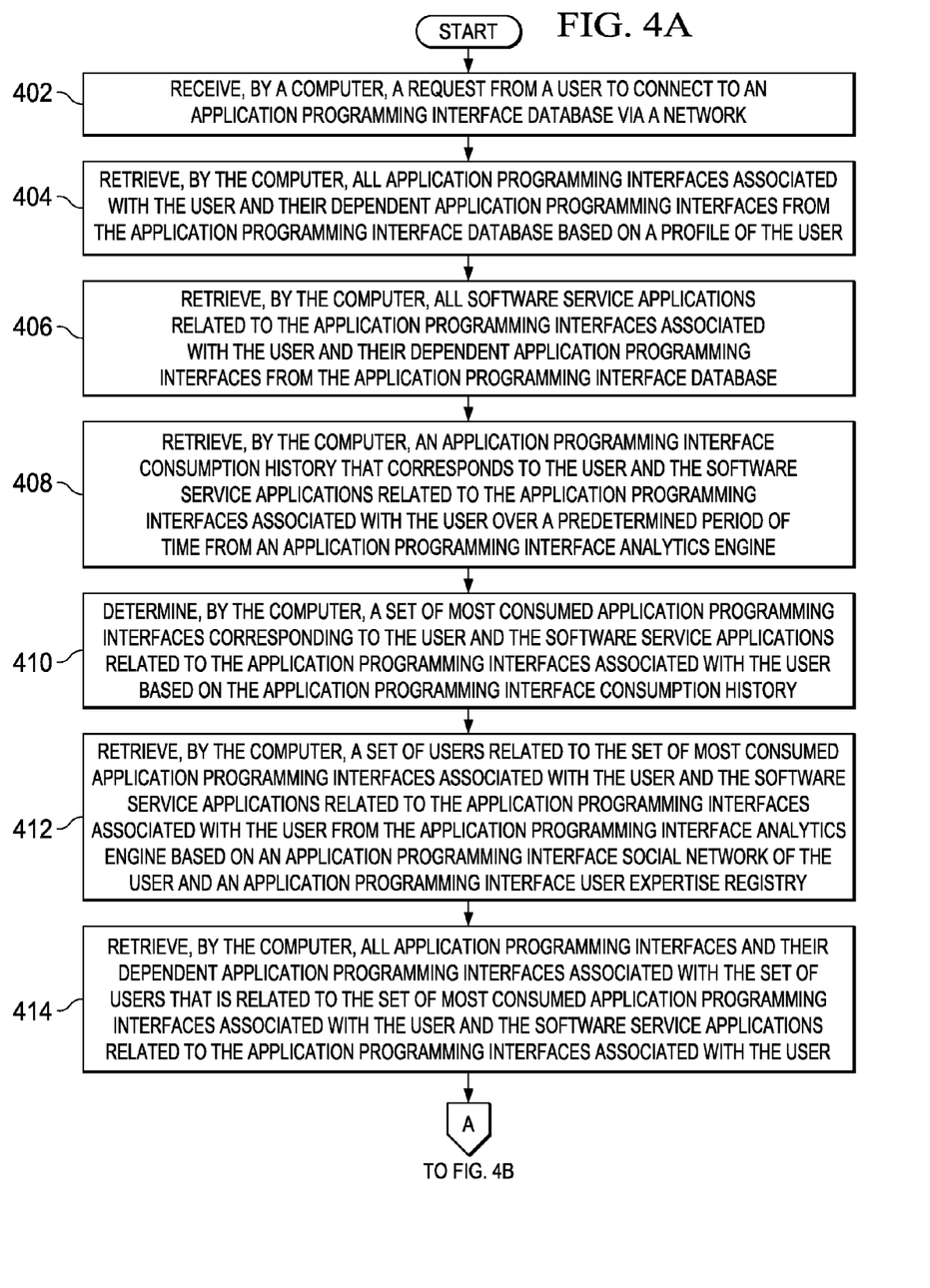
FIGS. 4A-4B are a flowchart illustrating a process for generating a set of application programming interface consumption prediction models associated with a user in accordance with an illustrative embodiment.
Figure 4B:
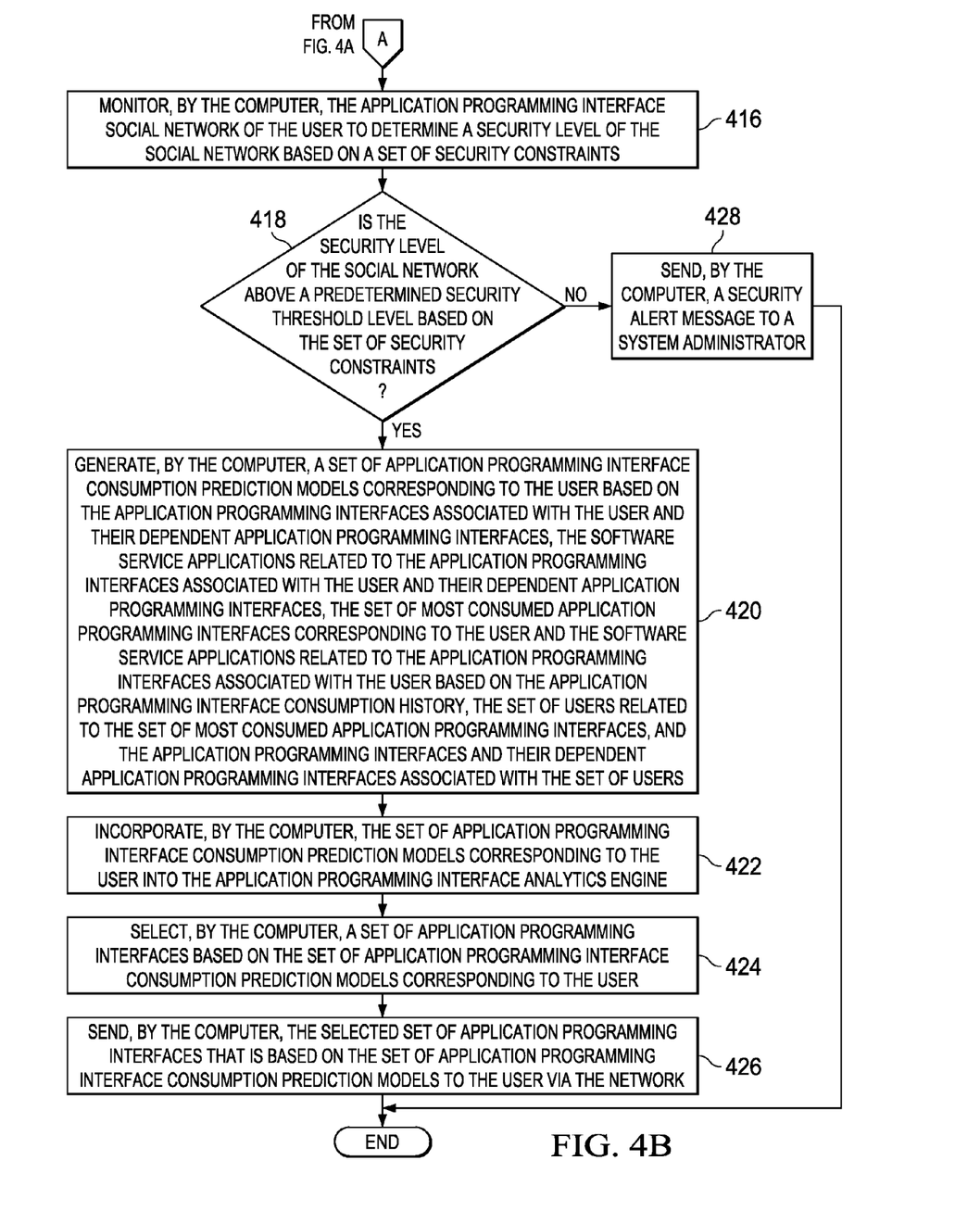

With reference now to FIGS. 4A-4B, a flowchart illustrating a process for generating a set of application programming interface consumption prediction models associated with a user is shown in accordance with an illustrative embodiment. The process shown in FIGS. 4A-4B may be implemented in a computer, such as, for example, server 104 in FIG. 1 or data processing system 200 in FIG. 2.

The process begins when the computer receives a request from a user to connect to an application programming interface database via a network (step 402). The user may be an application programming interface developer or consumer. Also, the user may be a user listed within an application programming interface user database, such as application programming interface user database 220 in FIG. 2. The application programming interface database may be, for example, application programming interface database 218 in FIG. 2. The network may be, for example, network 102 in FIG. 1.

After receiving the request from the user to connect to the application programming interface database in step 402, the computer retrieves all application programming interfaces associated with the user and their dependent application programming interfaces from the application programming interface database based on a profile of the user (step 404). The application programming interfaces associated with the user and their dependent application programming interfaces may be, for example, one or more of application programming interfaces 230 and/or composite application programming interfaces 232 in FIG. 2. The profile of the user may be, for example, a user profile in profiles 236 in FIG. 2. The profile may include information, such as, for example, name and identifier of the user; a role of the user; names and identifiers of all application programming interfaces the user has developed, collaborated on, worked on, used, and owns; names and identifiers of all dependent application programming interfaces; and names and identifiers of all software service applications related to the application programming interfaces associated with the user and their dependent application programming interfaces.

In addition, the computer retrieves all software service applications related to the application programming interfaces associated with the user and their dependent application programming interfaces from the application programming interface database (step 406). Further, the computer retrieves an application programming interface consumption history that corresponds to the user and the software service applications related to the application programming interfaces associated with the user over a predetermined period of time from an application programming interface analytics engine (step 408). The application programming interface consumption history corresponding to the user may be, for example, application programming interface history 314 located in the underlying data model of application programming interface analytics engine 302 in FIG. 3.

Subsequently, the computer determines a set of most consumed application programming interfaces corresponding to the user and the software service applications related to the application programming interfaces associated with the user based on the application programming interface consumption history (step 410). Furthermore, the computer retrieves a set of users related to the set of most consumed application programming interfaces associated with the user and the software service applications related to the application programming interfaces associated with the user from the application programming interface analytics engine based on an application programming interface social network of the user and an application programming interface user expertise registry (step 412). The application programming interface social network of the user and the application programming interface user expertise registry may be, for example, application programming interface social network 222 and application programming interface user expertise registry 224 in FIG. 2. Moreover, the computer retrieves all application programming interfaces and their dependent application programming interfaces associated with the set of users that is related to the set of most consumed application programming interfaces associated with the user and the software service applications related to the application programming interfaces associated with the user (step 414).

The computer also monitors the application programming interface social network of the user to determine a security level of the social network based on a set of security constraints (step 416). The security level of the social network and the set of security constraints may be, for example, security level 238 and security constraints 240 in FIG. 2. After monitoring the application programming interface social network of the user in step 416, the computer makes a determination as to whether the security level of the social network is above a predetermined security threshold level based on the set of security constraints (step 418). The predetermined security threshold level may be, for example, threshold 242 in FIG. 2.

If the computer determines that the security level of the social network is above the predetermined security threshold level based on the set of security constraints, yes output of step 418, then the computer generates a set of application programming interface consumption prediction models corresponding to the user based on the application programming interfaces associated with the user and their dependent application programming interfaces, the software service applications related to the application programming interfaces associated with the user and their dependent application programming interfaces, the set of most consumed application programming interfaces corresponding to the user and the software service applications related to the application programming interfaces associated with the user based on the application programming interface consumption history, the set of users related to the set of most consumed application programming interfaces, and the application programming interfaces and their dependent application programming interfaces associated with the set of users (step 420). The set of application programming interface consumption prediction models corresponding to the user may be, for example, application programming interface consumption prediction models 226 in FIG. 2. In addition, the computer incorporates the set of application programming interface consumption prediction models corresponding to the user into the application programming interface analytics engine (step 422).

Further, the computer selects a set of application programming interfaces based on the set of application programming interface consumption prediction models corresponding to the user (step 424). Subsequently, the computer sends the selected set of application programming interfaces that is based on the set of application programming interface consumption prediction models to the user via the network (step 426). Thereafter, the process terminates.

Returning again to step 418, if the computer determines that the security level of the social network is below the predetermined security threshold level based on the set of security constraints, no output of step 418, then the computer sends a security alert message to a system administrator (step 428). Thereafter, the process terminates.

Thus, illustrative embodiments provide a computer-implemented method, computer system, and computer program product for predicting consumption of application programming interfaces using social networks of application programming interface providers and consumers. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for predicting consumption of application programming interfaces, the computer-implemented method comprising:
   determining, by a computer, a set of consumed application programming interfaces corresponding to a user and software service applications related to application programming interfaces associated with the user based on an application programming interface consumption history;
   retrieving, by the computer, a set of users related to the set of consumed application programming interfaces corresponding to the user and the software service applications related to the application programming interfaces associated with the user from an application programming interface analytics engine based on an application programming interface social network of the user and an application programming interface user expertise registry; and
   generating, by the computer, a set of application programming interface consumption prediction models corresponding to the user based on the application programming interfaces associated with the user and their dependent application programming interfaces, the software service applications related to the application programming interfaces associated with the user and their dependent application programming interfaces, the set of consumed application programming interfaces corresponding to the user and the software service applications related to the application programming interfaces associated with the user based on the application programming interface consumption history, the set of users related to the set of consumed application programming interfaces, and application programming interfaces and their dependent application programming interfaces associated with the set of users.

2. The computer-implemented method of claim 1, further comprising:
   selecting, by the computer, a set of application programming interfaces based on the set of application programming interface consumption prediction models corresponding to the user; and
   sending, by the computer, the selected set of application programming interfaces that is based on the set of application programming interface consumption prediction models to the user via a network.

3. The computer-implemented method of claim 1, further comprising:
   incorporating, by the computer, the set of application programming interface consumption prediction models corresponding to the user into the application programming interface analytics engine.

4. The computer-implemented method of claim 1, further comprising:
   retrieving, by the computer, the application programming interface consumption history that corresponds to the user and the software service applications related to the application programming interfaces associated with the user over a predetermined period of time from the application programming interface analytics engine.

5. The computer-implemented method of claim 1, further comprising:
   retrieving, by the computer, the application programming interfaces associated with the user and their dependent application programming interfaces from an application programming interface database based on a profile of the user.

6. The computer-implemented method of claim 1, further comprising:
   monitoring, by the computer, the application programming interface social network of the user to determine a security level of the application programming interface social network based on a set of security constraints.

7. The computer-implemented method of claim 6, further comprising:
   responsive to the computer determining that the security level of the application programming interface social network of the user is below a predetermined security threshold value based on the set of security constraints, sending, by the computer, a security alert message to a system administrator; and
   responsive to the computer determining that the security level of the application programming interface social network of the user is above the predetermined security threshold value based on the set of security constraints, generating, by the computer, the set of application programming interface consumption prediction models corresponding to the user.

8. The computer-implemented method of claim 1, wherein a data model of the application programming interface analytics engine is a noise-tolerant time-varying factor graph that models and predicts application programming interface consumption by each of a plurality of users.

9. The computer-implemented method of claim 1, wherein the computer predicts use and allocation of system resources for hosting application programming interfaces, composite application programming interfaces, and related software service applications.

10. A computer system for predicting consumption of application programming interfaces, the computer system comprising:
    a bus system;
    a storage device connected to the bus system, wherein the storage device stores computer readable program code; and
    a processor unit connected to the bus system, wherein the processor unit executes the computer readable program code to determine a set of consumed application programming interfaces corresponding to a user and software service applications related to application programming interfaces associated with the user based on an application programming interface consumption history; retrieve a set of users related to the set of consumed application programming interfaces corresponding to the user and the software service applications related to the application programming interfaces associated with the user from an application programming interface analytics engine based on an application programming interface social network of the user and an application programming interface user expertise registry; and generate a set of application programming interface consumption prediction models corresponding to the user based on the application programming interfaces associated with the user and their dependent application programming interfaces, the software service applications related to the application programming interfaces associated with the user and their dependent application programming interfaces, the set of consumed application programming interfaces corresponding to the user and the software service applications related to the application programming interfaces associated with the user based on the application programming interface consumption history, the set of users related to the set of consumed application programming interfaces, and application programming interfaces and their dependent application programming interfaces associated with the set of users.

11. The computer system of claim 10, wherein the processor unit further executes the computer readable program code to select a set of application programming interfaces based on the set of application programming interface consumption prediction models corresponding to the user; and send the selected set of application programming interfaces that is based on the set of application programming interface consumption prediction models to the user via a network.

12. The computer system of claim 10, wherein the processor unit further executes the computer readable program code to incorporate the set of application programming interface consumption prediction models corresponding to the user into the application programming interface analytics engine.

13. The computer system of claim 10, wherein the processor unit further executes the computer readable program code to retrieve the application programming interface consumption history that corresponds to the user and the software service applications related to the application programming interfaces associated with the user over a predetermined period of time from the application programming interface analytics engine.

14. A computer program product stored on a computer readable storage medium having computer readable program code encoded thereon that is executable by a computer for predicting consumption of application programming interfaces, the computer program product comprising:
computer readable program code to determine a set of consumed application programming interfaces corresponding to a user and software service applications related to application programming interfaces associated with the user based on an application programming interface consumption history;
computer readable program code to retrieve a set of users related to the set of consumed application programming interfaces corresponding to the user and the software service applications related to the application programming interfaces associated with the user from an application programming interface analytics engine based on an application programming interface social network of the user and an application programming interface user expertise registry; and
computer readable program code to generate a set of application programming interface consumption prediction models corresponding to the user based on the application programming interfaces associated with the user and their dependent application programming interfaces, the software service applications related to the application programming interfaces associated with the user and their dependent application programming interfaces, the set of consumed application programming interfaces corresponding to the user and the software service applications related to the application programming interfaces associated with the user based on the application programming interface consumption history, the set of users related to the set of consumed application programming interfaces, and application programming interfaces and their dependent application programming interfaces associated with the set of users.

15. The computer program product of claim 14, further comprising:
computer readable program code to select a set of application programming interfaces based on the set of application programming interface consumption prediction models corresponding to the user; and
computer readable program code to send the selected set of application programming interfaces that is based on the set of application programming interface consumption prediction models to the user via a network.

16. The computer program product of claim 14, further comprising:
computer readable program code to incorporate the set of application programming interface consumption prediction models corresponding to the user into the application programming interface analytics engine.

17. The computer program product of claim 14, further comprising:
computer readable program code to retrieve the application programming interface consumption history that corresponds to the user and the software service applications related to the application programming interfaces associated with the user over a predetermined period of time from the application programming interface analytics engine.

18. The computer program product of claim 14, further comprising:
computer readable program code to retrieve the application programming interfaces associated with the user and their dependent application programming interfaces from an application programming interface database based on a profile of the user.

19. The computer program product of claim 14, further comprising:
computer readable program code to monitor the application programming interface social network of the user to determine a security level of the application programming interface social network based on a set of security constraints.

20. The computer program product of claim 19, further comprising:
computer readable program code, responsive to determining that the security level of the application programming interface social network of the user is below a predetermined security threshold value based on the set of security constraints, to send a security alert message to a system administrator; and
computer readable program code, responsive to determining that the security level of the application programming interface social network of the user is above the predetermined security threshold value based on the set of security constraints, to generate the set of application programming interface consumption prediction models corresponding to the user.

* * * * *